United States Patent
Huijer

(10) Patent No.: US 7,334,309 B2
(45) Date of Patent: Feb. 26, 2008

(54) METHOD OF MOUNTING A ROOF ASSEMBLY INTO THE INTERIOR OF A VEHICLE; AS WELL AS SUCH ROOF ASSEMBLY AND A VEHICLE

(75) Inventor: Johannes Nicolaas Huijer, Zandvoort (NL)

(73) Assignee: Inalfa Aftermarket Group B.V. (NL)

( * ) Notice: Subject to any disclaimer, the term of this patent is extended or adjusted under 35 U.S.C. 154(b) by 173 days.

(21) Appl. No.: 10/939,030

(22) Filed: Sep. 10, 2004

(65) Prior Publication Data
US 2005/0057078 A1    Mar. 17, 2005

(30) Foreign Application Priority Data
Sep. 11, 2003    (NL) ................................. 1024267

(51) Int. Cl.
*B23P 25/00*    (2006.01)
*B62D 25/06*    (2006.01)

(52) U.S. Cl. .......................... 29/458; 29/469; 296/210

(58) Field of Classification Search .................. 29/469, 29/458, 401.1; 296/210, 214, 216.01, 216.06, 296/216.07, 216.09, 218, 225, 216.02, 216.03, 296/216.04, 216.05, 216.08
See application file for complete search history.

(56) References Cited

U.S. PATENT DOCUMENTS

| | | | | |
|---|---|---|---|---|
| 3,033,608 A | * | 5/1962 | Hans | 296/215 |
| 4,685,724 A | * | 8/1987 | Niwa | 296/216.03 |
| 5,299,791 A | * | 4/1994 | Schlapp | 296/219 |
| 5,599,059 A | * | 2/1997 | Shann | 296/216.04 |
| 6,367,872 B1 | * | 4/2002 | Bohm et al. | 296/214 |
| 6,470,559 B1 | * | 10/2002 | Spaulding et al. | 29/469.5 |
| 6,513,865 B1 | * | 2/2003 | Lutz et al. | 296/216.01 |
| 6,609,750 B1 | * | 8/2003 | Cauduro | 296/216.02 |
| 6,865,795 B2 | * | 3/2005 | Hernandez et al. | 29/469 |
| 2004/0135403 A1 | * | 7/2004 | Tamura et al. | 296/216.02 |

FOREIGN PATENT DOCUMENTS

| | | | |
|---|---|---|---|
| EP | 507486 A1 | * | 10/1992 |
| JP | 63222924 A | * | 9/1988 |

* cited by examiner

*Primary Examiner*—Essama Omgba
(74) *Attorney, Agent, or Firm*—Steven M. Koehler; Westman, Champlin & Kelly, P.A.

(57) ABSTRACT

A method is provided for mounting a roof assembly into the interior of a vehicle having a fixed roof and an interior roof cover shell. A substrate is attached to the lower side of a frame. A roof opening is made in the vehicle roof and in the cover shell. The circumference of the shell opening is made slightly larger than the outer circumference of the substrate, at least at the position of the inner circumference of the cover shell after assembly. The frame and the substrate attached to the lower side thereof are mounted to the vehicle roof and the outer circumference of the substrate is fixed to the inner circumference of the cover shell opening. The substrate and cover shell may be demounted as a unit before a flexible cover is provided over the lower side of the cover shell and substrate. The unit of substrate, cover shell and cover is mounted again to the frame and vehicle roof.

13 Claims, 3 Drawing Sheets

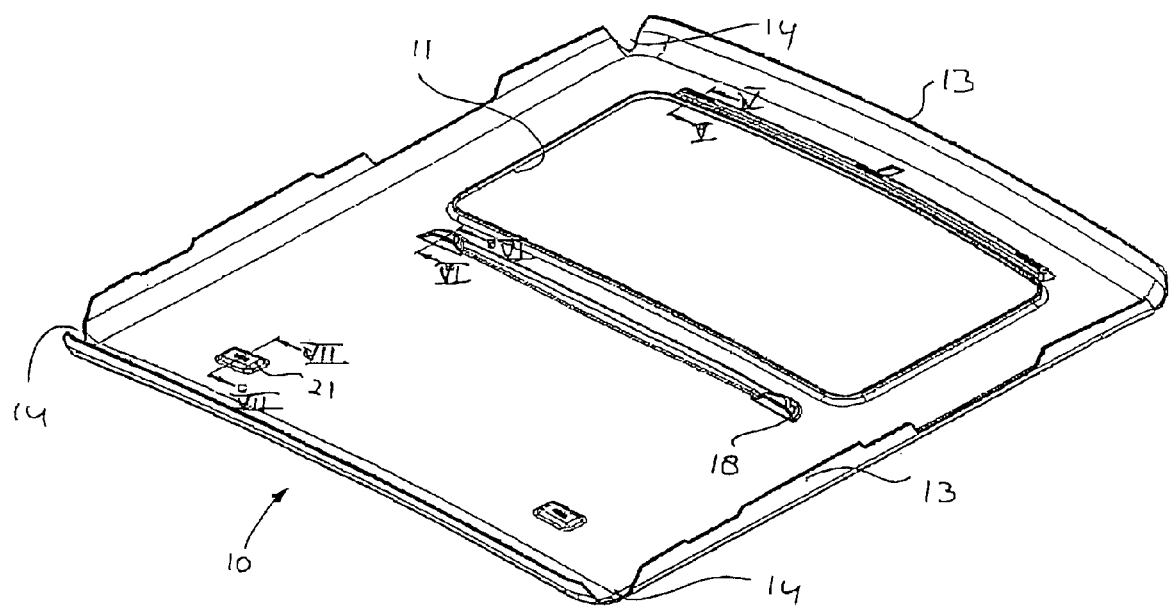
Fig. 4
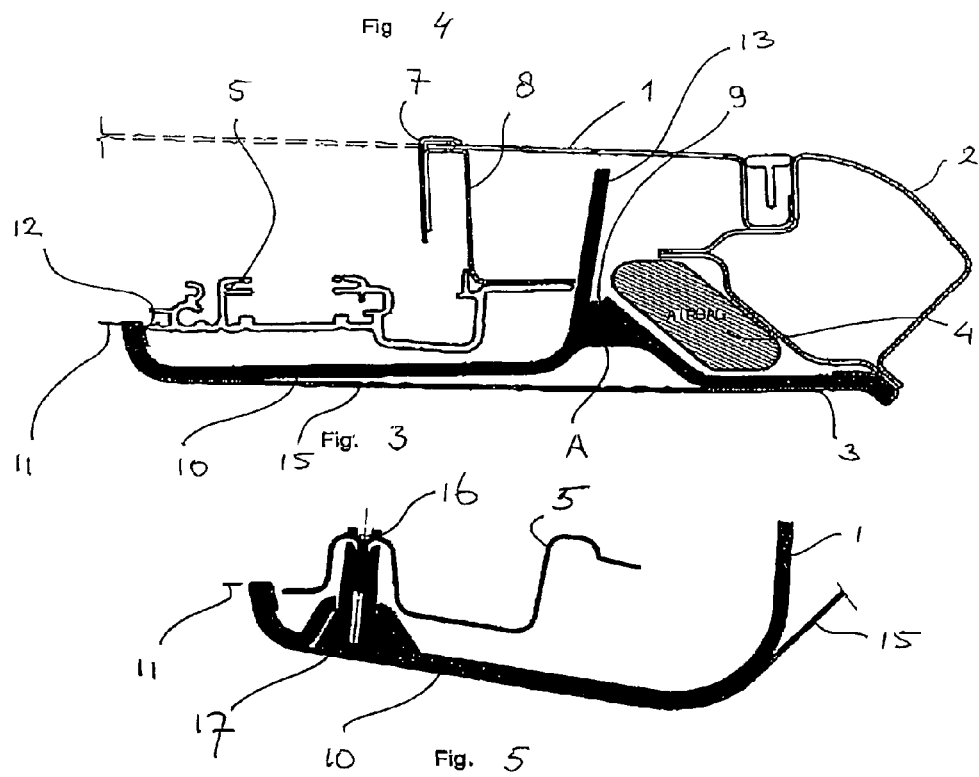
Fig. 3
Fig. 5

METHOD OF MOUNTING A ROOF ASSEMBLY INTO THE INTERIOR OF A VEHICLE; AS WELL AS SUCH ROOF ASSEMBLY AND A VEHICLE

BACKGROUND OF THE INVENTION

1. Field of the Invention

This invention relates to a method of mounting a roof assembly into the interior of a vehicle having a fixed roof and an interior roof cover shell. The invention also relates to a roof assembly to be used in this method and to a vehicle comprising such roof assembly.

2. Description of Prior Art

In the past, passenger cars were fitted with a flexible roof cover, which could be used again after a roof assembly was built into the car. However, modern cars have a rigid cover shell which has a predefined shape. This rigid shell allows easy and fast mounting to the fixed roof and has a better sound insulation. Furthermore, it has good head impact absorption properties, so that the car can more easily meet the safety requirements, such as the FMVSS 201 (head impact interior upper).

Due to the rigid roof cover shell, the roof assembly manufacturers were forced to look for another finishing. One of the solutions was the use of a so-called substrate, which is a shell that covers the lower side of the frame of the roof assembly and which also determines the interior opening of the roof assembly and forms the basis for attachment of an additional interior roof cover for finishing the interior. This substrate is generally made from a material having good sound insulating and head impact absorption properties.

When the roof assembly is to be mounted into the vehicle, there is cut an opening in the existing roof cover shell. This opening is slightly larger than the circumference of the roof assembly frame. A separate flexible cover is stretched between the opening in the substrate and the outer circumference of the roof cover shell. This application of the flexible cover is relatively difficult and requires skills from the person mounting the roof assembly, which is a disadvantage since skilled persons are hard to get and expensive.

Another disadvantage of the known roof assembly is that if the roof assembly is serviced during its life cycle, it is difficult to reach the roof assembly and in many occasions, the flexible cover is damaged so that a new flexible cover must be applied.

A further complication is the use of head air bags in passenger cars. These air bags are generally mounted behind the roof cover shell and when these air bags are activated, the edges of the roof cover shell are pushed away. The roof cover shell is specially designed to allow the air bag to inflate, but if an aftermarket roof is mounted to the car, the structure of the roof cover shell is affected due to the opening made therein.

It is an object of the invention to provide a method of mounting a roof assembly, and such roof assembly to remove or reduce one or more of the disadvantages mentioned above.

SUMMARY OF THE INVENTION

In order to obtain one or more of the objects mentioned above, the invention provides a method of mounting a roof assembly into the interior of a vehicle having a fixed roof and an interior roof cover shell, including the steps of:

providing a frame of the roof assembly supporting an adjustable closure;

providing a substrate to be attached to the lower side of the frame, said substrate having an outer circumference;

making a roof opening in the vehicle roof, adapted to be closed by the closure, and making an opening in the cover shell, the inner circumference of which being slightly larger than the outer circumference of the substrate, at least at the position of the inner circumference of the cover shell after assembly;

mounting the frame and the substrate attached to the lower side thereof to the vehicle roof and fixing the circumference of the substrate to the inner circumference of the shell opening;

demounting the substrate and shell as a unit, and providing a flexible cover over the lower side of the shell and substrate; and mounting the unit of substrate, shell and flexible cover to the frame and vehicle roof.

Due to the fact that the roof assembly frame, substrate and the roof cover shell of the vehicle are fixed to each other in order to form a unit, it is easier to demount these parts, allowing a person to provide the flexible cover on the unit outside the vehicle. Of course, if a person is skilled in the art of mounting the roof assemblies and providing the flexible cover, it is still possible to apply the flexible roof cover without demounting the unit.

A very easy way of fixing the outer circumference or the substrate to the shell is to use an amount of moldable adhering substance bridging any gap between the shell and the substrate at least along a part of the circumference of the substrate. This moldable adhering substance is easy to apply and easily adapts to variations in the gap between the substrate and the roof cover shell. It also provides a proper fixation of the substrate to the roof cover shell, thereby restoring the structure of the shell allowing a proper function of the air bags behind the roof cover shell.

Preferably, the substrate is provided with an outer edge extending upwardly, while the shell is provided with an inner edge, such shell and such substrate are connected through the edges. These edges provide sufficient surface for the fixing device, in particular the moldable adhering substance, such as (foamed) PUR glue or paste, silicon paste or the like.

The roof assembly for a vehicle having an opening in its fixed roof according to the invention comprises a frame to be fixed to the vehicle roof and supporting an adjustable closure for selectively opening and closing said roof opening; a substrate to be attached to the lower side of the frame, said substrate having an outer circumference including an outer edge extending upwardly to a position just below an upper side of a mounting member for mounting the roof assembly to the fixed roof of the vehicle.

Preferably, the frame and substrate comprise fixing members for connecting the substrate to the frame, which fixing members are accessible from the upper side of the frame, or allow disconnection of the substrate and frame without damaging the flexible cover. These fixing members may include at least one of fixing screws which can be tightened and loosened from above, press fasteners, clips or the like, and engaging members, such as hooks, which are adapted to be brought into and out of engagement by a relative sliding movement of the frame and the substrate.

Due to these fixing members, it is very easy to demount the unit of substrate and roof cover shell without damaging the flexible cover attached thereto. As a result it is possible to remove the unit, for example for maintenance or repair of the roof assembly, and mounted it again without any problem or risk of damaging the flexible cover.

Finally, the invention includes a vehicle having an opening in its fixed roof, comprising an interior roof cover shell releasably attached to the lower side of the fixed roof and having an opening therein, a frame fixed to the vehicle roof and supporting an adjustable closure for selectively opening and closing said roof opening; and a substrate attached to the lower side of the frame, said substrate having an outer circumference including an outer edge extending upwardly to a position just below the fixed roof, said edge of the substrate being positioned closely to the inner circumference of the cover shell opening and being fixed thereto by a self-adjusting fixing device.

BRIEF DESCRIPTION OF THE DRAWINGS

FIG. 3 is an enlarged cross sectional view according to the line III-III in FIG. 1, showing the roof assembly in mounted and finished condition.

FIG. 4 is a perspective view of the substrate according to the invention, as viewed from the above;

FIGS. 5, 6, 7 are enlarged sectional views according to the lines V-V, VI-VI and VII-VII, respectively, in FIG. 4, however in mounted condition.

DETAILED DESCRIPTION OF AN ILLUSTRATIVE EMBODIMENT

Figure 1:
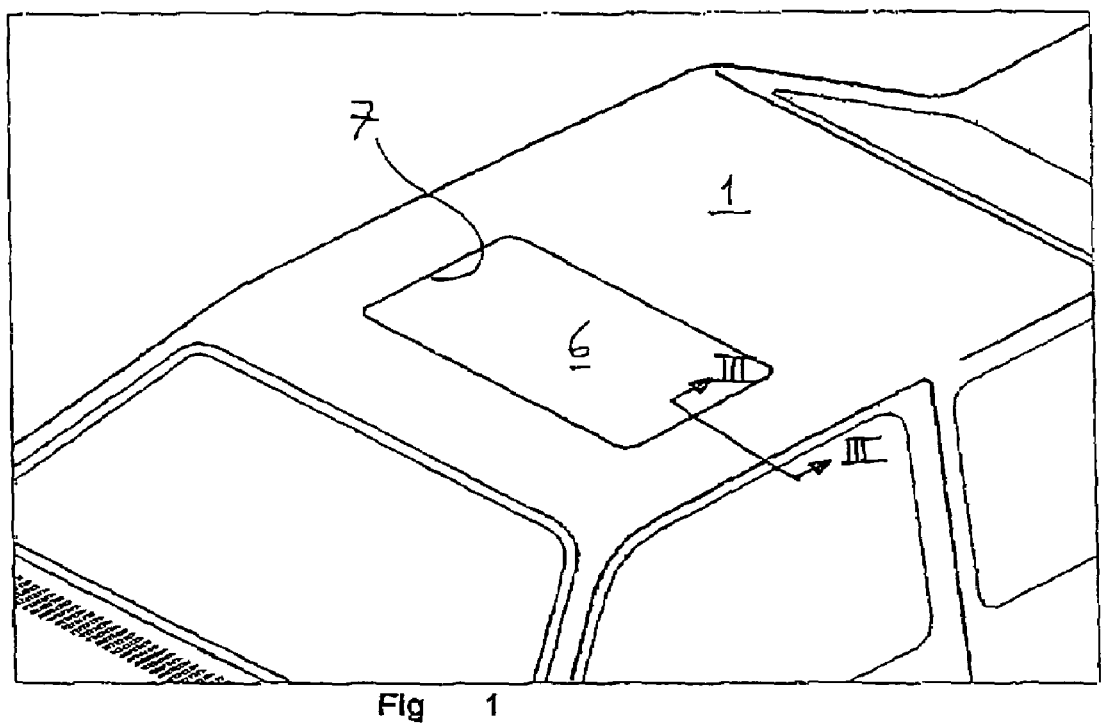
FIG. 1 is a perspective view of a vehicle roof including a roof assembly according to the invention.
Figure 6:
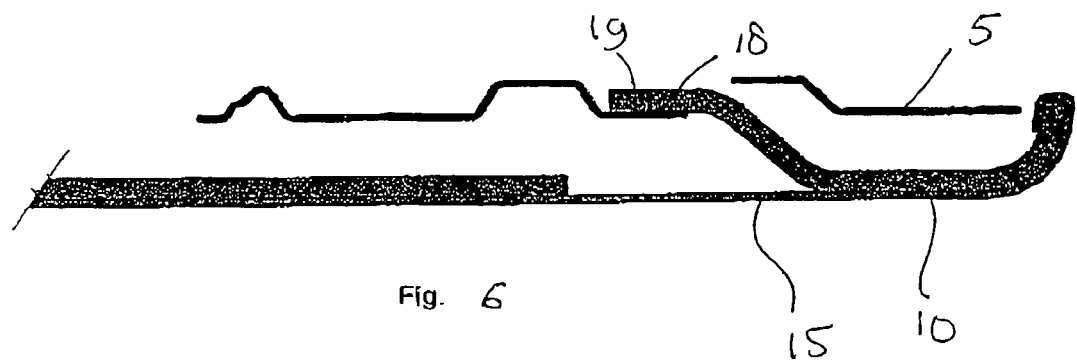
Figure 2:
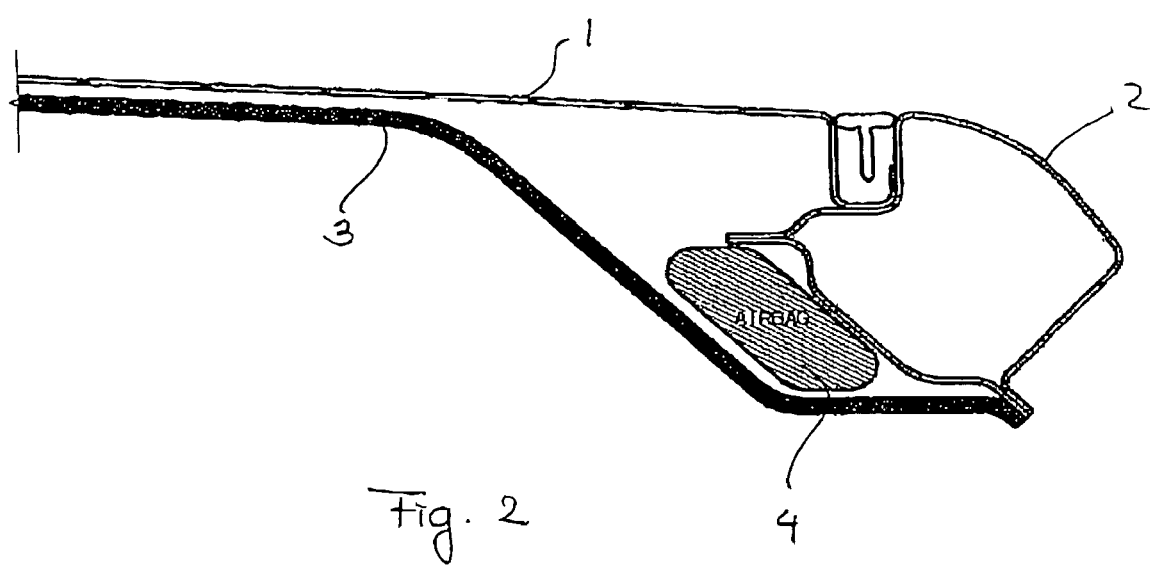
FIG. 2 is an enlarged sectional view according to the line III-III in FIG. 1, however, before the roof assembly is mounted to the fixed roof of the vehicle.

Referring to the drawings, and in particular FIG. 1, there is shown a vehicle, in particular a passenger car. The vehicle is provided with a fixed roof 1 which is not provided with a roof opening when the vehicle is manufactured. FIG. 2 shows a cross section of this fixed roof 1, which is provided with a side reinforcement beam 2. The lower side of the fixed roof 1 is covered with a rigid cover shell 3, providing a visually attractive interior cover, sound insulation and impact absorption during collisions. The vehicle may be fitted with lateral head air bags 4 which are mounted to the reinforcement beam 2 at a position above the cover shell 3 and are thus hidden from view by the cover shell.

FIG. 3 is a cross sectional view of the fixed roof after mounting the roof assembly according to the invention. There is shown a part of a frame 5 or other stationary part of the roof assembly which supports an adjustable closure 6, such as a rigid panel or the like (see FIG. 1). The closure is intended to selectively open and close a roof opening 7 which is cut into the fixed roof 1. The frame 5 is mounted directly to the fixed roof 1 by mounting members 8 which are known in the art. The mounting members 8 may be separate parts or may be integrated within the frame. In order to allow the frame 5 to be fixed to the fixed roof 1, there is cut an opening 9 in the cover shell 3.

The roof assembly according to the invention is provided with a substrate 10 which, in this case, is a rigid cover plate covering the frame 5 from below, and having the properties of the original cover shell 3 regarding head impact absorption, noise insulation, structure reinforcement and the like. For this purpose, the substrate may be made from a wood fiber sheet containing adhesive agent (isowood). However, other materials, such as plastics, are conceivable.

The substrate 10 is provided with a passage opening 11 fitting in the opening 12 in the frame 5. At the outer circumference of the substrate 10 there is provided an upstanding edge 13 which is provided at the main portion of the circumference of the substrate 10, but in the present embodiment, it is interrupted in several places. For example, there are interruptions 14 at the corners of the substrate in order to allow drain pipes, tubes or hoses to pass in order to discharge any leakage water from the frame to the outside of the vehicle. The circumferential edge 13 of the substrate 10 extends upwardly to such an extent that it ends at a position just below the upper side of the mounting members 8 of the frame and, after assembly, it extends almost up to the lower side of the fixed roof 1. Of course some variations may occur here as long as this edge 13 can be used to fix the substrate 10 to the remainder of the cover shell 3.

For this purpose, the opening 9 in the cover shell is accurately made, such that there is maximally only a small gap between the outer circumference of the opening 9 in the cover shell 3 and the outer circumference of the substrate 10 at the height of the opening 9 in the cover shell. The opening 9 in the cover shell 3 is cut at such position that, in this case, the cover shell extends outwardly and downwardly from the opening 9, although this is not necessary. In this embodiment, the inclined edge 13 of the substrate 10 and the inclined cover shell 3 together form an inverted V-shaped groove.

In order to fix the substrate 10 to the cover shell 3, it is proposed according to the invention to use a moldable adhering substance A, which preferably has the properties of easily bridging any gap between the substrate 10 and the cover shell 3, providing a strong fixation and drying quickly. For example a (foamed) paste or glue may be used, such as PUR paste, or silicone paste or the like. Any other adhering substance or any other fixing device which is easy to apply and which can easily be adjusted or preferably is self-adjusting to variations in the dimensions of the gap between the substrate 10 and the cover shell 3 can be used. Thus, clamps and the like are also conceivable. The moldable adhering substance may be provided along the whole edge 13 or only in selected positions, depending on the requirements. Preferably, the adhering substance A is applied such that there is created a distance between the lower side of the substrate 10 and the lower side of the adhering substance, so that the adhering substance A does not project downwardly below the substrate 10.

After the fixing device is applied the substrate 10 and cover shell 3 form a unit. Due to the correct position of the cover shell 3 to the fixed roof 1 and of the substrate 10 to the frame 5 (and the frame 5 to the fixed roof 1), the substrate 10 and the cover shell 3 are always fixed to each other in the correct relative position.

Since the substrate 10 and frame 5 are provided with fixing members which allow removal of the substrate 10 from the frame 5, it is possible to demount the unit of the substrate 10 and the cover shell 3 from the frame in order to allow the application of a flexible cover 15 to the substrate 10 and cover shell 3 in a demounted state of the unit. If this unit is demounted and removed from the vehicle, it is much easier to provide the flexible cover 15 to the lower side of the unit. As a result, the persons mounting the roof assembly do not have to be very skilled to mount the roof assembly to the vehicle and to mount the flexible cover 15 to the substrate 10 and cover shell 3.

Fixing members that can be used to releasably fix the substrate 10 to the frame 5 are shown in FIGS. 4-7. On the front side of the frame 5 and the substrate 10 there are provided fixing screws 16 which are mounted from above and can be reached so as to tighten or loosen the fixing screws 16 into and out of a counter member 17 in the substrate 10.

Near the centre of the frame 5 and the substrate 10 there are provided hooks 18, 19 or such engagement members which come into and out of engagement with each other during a relative sliding movement in longitudinal direction.

Figure 7:
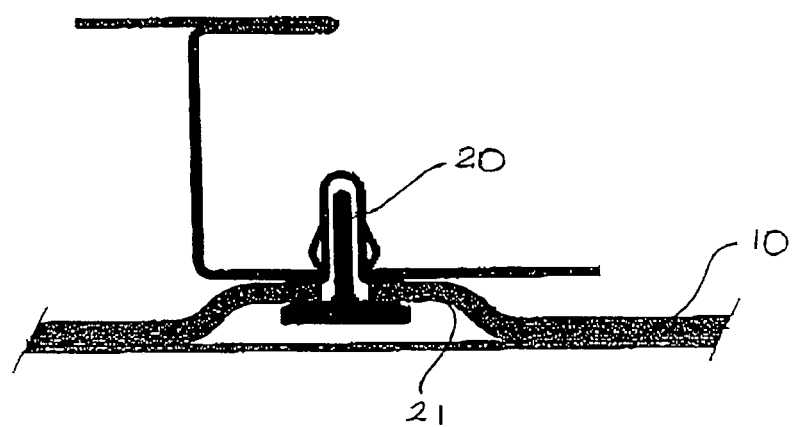

FIG. 7 shows the fixing members at the rear part of the substrate 10 and frame 5. In this embodiment they include clips 20 or press fasteners or the like which snap into and out of holes in the frame. The head of the clips 20 is received in a depression 21 in the substrate 10, so that the clips 20 are not visible when the substrate 10 is covered by the flexible cover 15.

The fixing members described and shown are such that the substrate 10 can be demounted from the frame 5 without damaging the flexible cover 15. The fixing screws 16 can be loosened my means of a screwdriver which can be brought into engagement with the fixing screw 16 from a position above the frame 5. The clips 20 can be removed from the holes in the frame 5 by pushing the clips from above or by pulling the substrate 10 downwardly and finally the substrate 10 is able to make a sliding movement with respect to the frame 5 so as to disengage the hooks 18 and 19.

The method of mounting a roof assembly into the interior of a vehicle according to one embodiment of the invention is as follows.

First, the opening 7 is accurately made in the fixed roof 1 and the opening 9 is cut in the cover shell 3 by means of a template or the like. Then the roof assembly, i.e. the frame 5, is mounted to the fixed roof 1, such that the closure 6 fits accurately within the roof opening 7 when the closure 6 is in the closed position. In a next step, the substrate 10 is fixed to the lower side of the frame 5 such that it fits within the opening 9 in the cover shell 3. The substrate 10 and the cover shell 3 are then fixed to each other by injecting the adhering substance into the groove between the substrate 20 and the cover shell 3. After drying of the adhering substance, the unit of substrate 10 and cover shell 3 is removed from the frame 5 and the reinforcement beam 2 of the fixed roof 1, and this unit is then removed from the vehicle. Outside the vehicle the unit may be placed upside down and in this position it is easy to attach the flexible cover 15 to the lower side of the unit such that it extends around the outer circumference of the cover shell 3 and around the inner circumference of the passage opening 11 in the substrate 10. The unit of substrate 10 and cover shell 3 with attached flexible cover 15 is then placed back into the interior of the vehicle and fixed to the frame 5 and reinforcement beam 2. The mounting operation is then finished. This mounting operation can be done quickly and by relatively low-skilled persons. Skilled persons may prefer to provide the flexible cover when the substrate 10 and cover shell 3 are still in mounted position, thereby saving demounting and mounting time. The advantage of being able to demount the unit of substrate, shell and cover for maintenance and repair purposes still exist then.

The invention is not limited to the embodiment shown in the drawing and describe herein before and can be varied in different manners within the scope of the invention. For example, the invention is not limited to passenger cars but also applies to other vehicles, such as trucks and the like. The cover may take other forms, for example a more rigid one.

The invention claimed is:

1. A method of mounting a roof assembly into the interior of a vehicle having a fixed roof and an interior roof cover shell, including the steps of:

providing a frame of the roof assembly supporting an adjustable closure;

providing a substrate to be attached to a lower side of the frame, said substrate having an outer circumference;

making a roof opening in the vehicle roof adapted to be closed by the closure, and making an opening in the cover shell, the opening defining an inner circumference of the cover shell that is slightly larger than the outer circumference of the substrate, at least at the position of the inner circumference of the cover shell after assembly;

mounting the frame and the substrate attached to the lower side thereof to the vehicle roof and fixing the outer circumference of the substrate to the inner circumference of the cover shell opening;

demounting the substrate and cover shell as a unit, and providing a flexible cover over the lower side of the cover shell and substrate; and mounting the unit of substrate, cover shell and flexible cover to the frame and vehicle roof.

2. The method as claimed in claim 1, wherein the outer circumference of the substrate is fixed to the cover shell by means of an amount of moldable adhering substance bridging any gap between the cover shell and the substrate at least along a part of the outer circumference of the substrate.

3. The method as claimed in claim 1, wherein the substrate is provided with an outer edge extending upwardly, and the cover shell is provided with an inner edge around the opening therein, said cover shell and said substrate being connected through these edges.

4. The method as claimed in claim 1, wherein the unit including the substrate and cover shell is removed from the vehicle in order to connect the flexible cover to the lower side thereof.

5. A method of mounting a roof assembly into the interior of a vehicle having a fixed roof and an interior roof cover shell, including the steps of:

providing a frame of the roof assembly supporting an adjustable closure;

providing a substrate to be attached to the lower side of the frame, said substrate having an outer circumference;

making a roof opening in the vehicle roof, adapted to be closed by the closure, and making an opening in the cover shell, defining an inner circumference of the cover shell which is slightly larger than the outer circumference of the substrate, at least at the position of the inner circumference of the cover shell after assembly;

mounting the frame to the vehicle roof and fixing the outer circumference of the substrate to the inner circumference of the cover shell, and providing a flexible cover over the lower side of the cover shell and substrate.

6. The method as claimed in claim 5, wherein the flexible cover is provided after the substrate and cover shell is demounted from the frame and fixed roof as a unit, and then the unit of substrate, cover shell and flexible cover is mounted again to the frame and vehicle roof.

7. The method of claim 5, wherein fixing the outer circumference of the substrate to the inner circumference of the cover shell comprises using a fixing device that spans a gap between the substrate and the cover shell.

8. The method of claim 5, wherein fixing the outer circumference of the substrate to the inner circumference of the cover shell comprises using a fixing device that is self-adjusting to variations in dimensions of a gap between the substrate and the cover shell.

9. The method of claim 5, wherein fixing the outer circumference of the substrate to the inner circumference of the cover shell comprises using a fixing device that comprises an adhering substance.

10. The method as claimed in claim 5, wherein fixing the outer circumference of the substrate to the cover shell comprises using an amount of moldable adhering substance bridging at least some of a gap between the cover shell and the substrate.

11. A vehicle having an opening in a fixed roof thereof, comprising an interior roof cover shell releasably attached to a lower side of the fixed roof and having an opening therein defining an inner circumference of the cover shell; a frame fixed to the vehicle roof and supporting an adjustable closure for selectively opening and closing said roof opening; a substrate attached to a lower side of the frame, said substrate having an outer circumference including an outer edge extending upwardly to a position substantially near the fixed roof, said outer edge of the substrate being positioned closely to the inner circumference of the cover shell and being fixed thereto by a self adjusting fixing device.

12. The vehicle as claimed in claim 11, wherein the fixing device is an amount of moldable adhering substance bridging any gap between the inner circumference of the roof cover shell opening and the substrate at least along a part of the circumference of the substrate.

13. The vehicle as claimed in claim 12, wherein the moldable adhering substance is applied at a distance above the lower side of the substrate.

* * * * *